(12) United States Patent
Fujiki et al.

(10) Patent No.: US 6,645,638 B2
(45) Date of Patent: Nov. 11, 2003

(54) SILICONE RUBBER ADHESIVE COMPOSITION AND INTEGRALLY MOLDED ARTICLE THEREOF

(75) Inventors: Hironao Fujiki, Gunma-ken (JP); Syuuichi Azechi, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/901,667

(22) Filed: Jul. 11, 2001

(65) Prior Publication Data

US 2002/0028335 A1 Mar. 7, 2002

(30) Foreign Application Priority Data

Jul. 11, 2000 (JP) ........................................ 2000-209699

(51) Int. Cl.7 .............................................. B32B 25/20
(52) U.S. Cl. ...................... 428/447; 428/331; 428/412; 428/451; 525/100; 525/105; 525/106; 528/21; 528/25; 528/26
(58) Field of Search ................................. 428/447, 331, 428/412, 451; 525/100, 105, 106; 528/21, 25, 26

(56) References Cited

U.S. PATENT DOCUMENTS

| 4,582,762 A | 4/1986 | Onohara et al. |
| 4,686,124 A | 8/1987 | Onohara et al. |
| 4,788,254 A | * 11/1988 | Kawakubo et al. ......... 525/100 |
| 4,814,231 A | 3/1989 | Onohara et al. |
| 4,834,721 A | 5/1989 | Onohara et al. |
| 5,879,809 A | 3/1999 | Muramatsu et al. |
| 5,989,704 A | 11/1999 | Hashimoto et al. |

FOREIGN PATENT DOCUMENTS

| EP | 0276790 B1 | 8/1988 |
| JP | A63183843 | 7/1988 |
| JP | B26345292 | 9/1988 |
| JP | B2234311 | 8/1990 |
| JP | A9165516 | 6/1997 |
| JP | A9165517 | 6/1997 |

* cited by examiner

Primary Examiner—Robert Dawson
Assistant Examiner—Christopher Keehan
(74) Attorney, Agent, or Firm—Birch, Stewart, Kolasch & Birch, LLP

(57) ABSTRACT

A silicone rubber adhesive composition comprising (A) a heat curable organopolysiloxane composition of the addition curing type or peroxide curing type, (B) reinforcing silica fines, (C) an adhesive agent, and (D) a compound having at least one ester group in a molecule is easily moldable within a short time by injection molding, suitable in primerless molding, and bondable with various thermoplastic resins. Integrally molded articles in which the silicone rubber adhesive composition is firmly bonded to the thermoplastic resin are obtainable without a need for modification of the resin.

14 Claims, 6 Drawing Sheets

SILICONE RUBBER ADHESIVE COMPOSITION AND INTEGRALLY MOLDED ARTICLE THEREOF

This invention relates to a silicone rubber adhesive composition which can be simply and briefly molded by injection molding and exhibits good adhesion enough to allow for primerless molding and hence, integral molding with a thermoplastic resin. It also relates to an integrally molded article of a silicone rubber adhesive composition bonded to a thermoplastic resin.

BACKGROUND ART

Nowadays silicone rubber, due to its excellent characteristics, finds widespread use in a variety of fields including electric, electronic, automotive and building fields. The demands for the silicone rubber in these fields include workability, seal and insulation during assembly. In some applications where the adhesion of silicone rubber to resins is necessary, adhesion is achieved by way of primers. The process requires the step of applying primer and is thus cumbersome. One solution is a self-adhesive type silicone rubber obtained by adding an adhesive to a silicone rubber composition. The self-adhesive type silicone rubber eliminates the application step, shortens the operating time, reduces the cost, and improves the efficiency of operation. It is effective in manufacturing integrally molded articles with resins.

In connection with the primerless molding of addition type heat-curable silicone rubber, a number of reports have been made for bonding silicone rubber to organic resins. In one exemplary attempt, self-adhesive type silicone rubber material is cured on resins. A number of proposals have been made relating to specific adhesive components for use in the self-adhesive type silicone rubber. Also, JP-B 2-34311 corresponding to U.S. Pat. Nos. 4,582,762, 4,686,124, 4,814,231 and U.S. Pat. No. 4,834,721 discloses to add an organopolysiloxane containing at least 30 mol % of hydrogen atoms directly bonded to silicon atoms to an organic resin whereby the resin is bondable to an addition curing type silicone rubber. JP-B 63-45292 discloses the integration of silicone rubber to organic resin by physical engagement. JP-A 63-183843 corresponding to EP 0276790B discloses the integral adhesion of silicone rubber to an olefin resin having grafted thereto a compound having an aliphatic unsaturated group and a silicon atom-bonded hydrolyzable group. JP-A 9-165516 corresponding to U.S. Pat. No. 5,879,809 and JP-A 9-165517 corresponding to U.S. Pat. No. 5,989,704 of Shin-Etsu Chemical Co., Ltd. propose a process in which a thermoplastic resin having added thereto a compound having unsaturated groups and hydrogen atoms directly bonded to silicon atoms is adhesively joined and integrated with silicone rubber as well as an integrally molded article in which a thermoplastic resin having blended therein a thermoplastic oligomer containing aliphatic unsaturated groups is integrally molded with an oil-bleeding silicone rubber.

However, heat curable silicone rubber of the addition type fails to achieve within brief molding a sufficient bond to general thermoplastic resins such as ABS, PPO, PPS, PC, PE, PP, PBT, acrylic, PA and aromatic PA. To acquire a bonding ability, the resins must be modified as suggested in the above patents. Modification of resins requires extra steps and an increased cost, and the modified resins sometimes become susceptible to quality alteration. Even if a bond is established, without resin modification, in forming an integrated silicone rubber/resin article in a mold, there arises a problem that the molded article sticks to the mold. In particular, none of polyamide resins fully satisfy the requirements. It remains of interest to develop an integrally molded article of thermoplastic resin and silicone rubber which when formed in a mold, does not stick to the mold and establishes a firm bond between the thermoplastic resin and the silicone rubber.

SUMMARY OF THE INVENTION

An object of the invention is to provide a silicone rubber adhesive composition which can be firmly integrated with thermoplastic resins, as well as an integrally molded article thereof with a thermoplastic resin.

It has been found that a silicone rubber adhesive composition comprising a silicone rubber component, an adhesive agent, and a compound having at least one ester group in a molecule, preferably further containing at least one aliphatic unsaturated group is firmly bondable to thermoplastic resins. When this silicone rubber adhesive composition is molded and joined with a thermoplastic resin, there is obtained an integrally molded article in which the silicone rubber is firmly bonded to the thermoplastic resin. Even under brief curing conditions using an injection molding technique, the silicone rubber adhesive composition develops a sufficient bonding force to the thermoplastic resin. The integrally molded article of silicone rubber/thermoplastic resin can be released from the mold in a practically acceptable way. The silicone rubber adhesive composition is effective even to highly crystalline polyamide resins such as nylon 66 and aromatic polyamides.

The invention provides a silicone rubber adhesive composition comprising (A) 100 parts by weight of a heat curable organopolysiloxane composition, (B) 1 to 100 parts by weight of reinforcing silica fines, (C) 0.1 to 50 parts by weight of an adhesive agent, and (D) 0.05 to 20 parts by weight of a compound having at least one ester group in a molecule.

Also contemplated herein is an integrally molded article comprising the cured silicone rubber adhesive composition (i.e., silicone rubber) and a thermoplastic resin.

BRIEF DESCRIPTION OF THE DRAWINGS

FIG. 1 illustrates a bond strength test specimen,

DESCRIPTION OF PREFERRED EMBODIMENTS

Figure 1A:
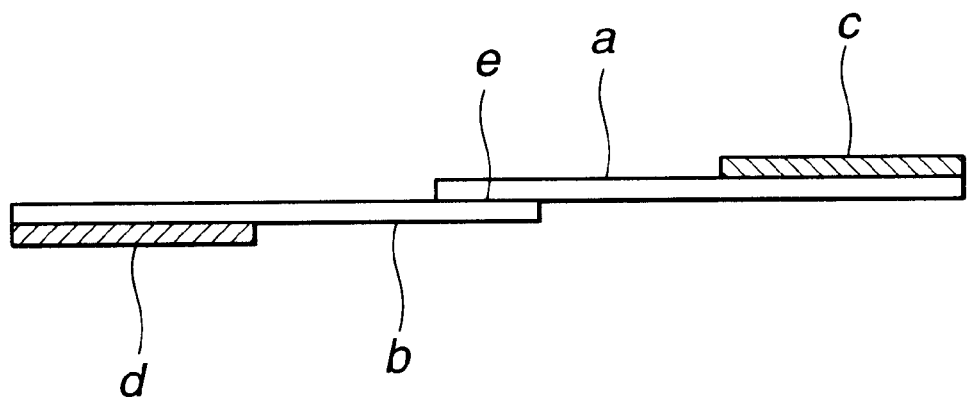
FIG. 1A being a cross-sectional view.

The silicone rubber adhesive composition of the invention includes as essential components, (A) a heat curable organopolysiloxane composition, (B) reinforcing silica fines, (C)

an adhesive agent, and (D) a compound having at least one ester group in a molecule.

Component (A) is a heat curable organopolysiloxane composition which may be either an addition reaction curing type organopolysiloxane composition or an organic peroxide curing type organopolysiloxane composition, with the former being preferred.

The addition reaction curing type organopolysiloxane composition is preferably defined as comprising (1) 100 parts by weight of an organopolysiloxane having on the average at least two alkenyl groups in a molecule, (2) 0.1 to 50 parts by weight of an organohydrogenpolysiloxane having on the average at least two hydrogen atoms attached to silicon atoms in a molecule, and (3) a catalytic amount of an addition reaction catalyst.

The organic peroxide curing type organopolysiloxane composition is preferably defined as comprising (i) 100 parts by weight of an organopolysiloxane having on the average at least two alkenyl groups in a molecule, and (ii) a catalytic amount of an organic peroxide.

In the addition reaction curing type organopolysiloxane composition, the organopolysiloxane having on the average at least two alkenyl groups in a molecule as component (1) is typically represented by the following average compositional formula (1):

$$R^1_a SiO_{(4-a)/2} \tag{1}$$

wherein $R^1$, which may be the same or different, is a substituted or unsubstituted monovalent hydrocarbon group of 1 to 12 carbon atoms, preferably 1 to 8 carbon atoms, and "a" is a positive number of 1.5 to 2.8, preferably 1.8 to 2.5, and more preferably 1.95 to 2.05.

Examples of the substituted or unsubstituted monovalent hydrocarbon groups attached to silicon atoms, represented by $R^1$, include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted ones of the foregoing groups in which some or all of the hydrogen atoms are replaced by halogen atoms (e.g., fluoro, bromo and chloro), cyano groups or the like, such as chloromethyl, chloropropyl, bromoethyl, trifluoropropyl and cyanoethyl.

At least two of the $R^1$ groups must be alkenyl groups, preferably of 2 to 8 carbon atoms, more preferably 2 to 6 carbon atoms. It is noted that the content of alkenyl groups is preferably 0.001 to 20 mol %, especially 0.01 to 10 mol % based on the entire organic groups attached to silicon atoms (that is, the substituted or unsubstituted monovalent hydrocarbon groups included as $R^1$ in formula (1)). The alkenyl groups may be attached to silicon atoms at ends of the molecular chain and/or silicon atoms midway the molecular chain. When the cure rate of the composition and the physical properties of cured parts are taken into account, the organopolysiloxane should preferably have at least alkenyl groups attached to the silicon atoms at molecular chain ends. The preferred groups represented by $R^1$ other than the alkenyl groups are alkyl groups such as methyl, aryl groups such as phenyl, and fluoroalkyl groups such as trifluoropropyl, with the alkyl groups being most preferred.

With respect to the structure, the organopolysiloxane is generally a diorganopolysiloxane of a basically straight chain structure whose backbone is comprised of recurring diorganosiloxane units $R^1_2SiO_{2/2}$ and which is blocked with a triorganosiloxy group $R^1_3SiO_{1/2}$ at either end of the molecular chain. However, it may have a partially branched or cyclic structure containing $R^1SiO_{3/2}$ and/or $SiO_{4/2}$ units. The alkenyl group-containing organopolysiloxane may have any desired degree of polymerization or viscosity, and encompasses from ones having a low degree of polymerization which are liquid at room temperature (25° C.) to gum-like ones having a high degree of polymerization. Often, the organopolysiloxane used herein has an average degree of polymerization (weight average degree of polymerization) of about 10 to 10,000, preferably about 50 to 10,000, more preferably about 100 to 10,000, and most preferably about 100 to 2,000. With an average degree of polymerization of less than 10, the cured rubber sometimes has unsatisfactory physical properties. It is noted that the organopolysiloxane preferably has a viscosity of about 100 to 1,000,000 centipoise at 25° C., and more preferably about 500 to 500,000 centipoise at 25° C.

As component (2), the organohydrogenpolysiloxane is typically represented by the following average compositional formula (2):

$$R^2_b H_c SiO_{(4-b-c)/2} \tag{2}$$

and should have at least two (generally 2 to about 300), preferably at least three, and more preferably 3 to about 150, silicon atom-attached hydrogen atoms (SiH groups).

In formula (2), $R^2$ is a substituted or unsubstituted monovalent hydrocarbon group of 1 to 12 carbon atoms, examples of which are as described for $R^1$ in formula (1). Hydrocarbon groups free of aliphatic unsaturation are preferred, with alkyl groups such as methyl being especially preferred. The letter b is a positive number of 0.7 to 2.1, c is a positive number of 0.001 to 1.0, and b+c is 0.8 to 3.0. Preferably, b is 1.0 to 2.0, c is 0.01 to 1.0, and b+c is 1.5 to 2.5.

At least two, preferably at least three SiH groups in the molecule may be positioned at ends and/or midway of the molecular chain. The molecular structure of organohydrogenpolysiloxane may be straight, cyclic, branched or three-dimensional network. Desirable are those which are liquid at room temperature (25° C.) and have a number of silicon atoms per molecule or a degree of polymerization in the range of about 2 to about 300, more desirably about 3 to about 150. It is noted that the organohydrogenpolysiloxane preferably has a viscosity of about 0.1 to 10,000 centipoise at 25° C., and more preferably about 0.5 to 5,000 centipoise at 25° C.

Exemplary organohydrogenpolysiloxanes of formula (2) include 1,1,3,3-tetramethyldisiloxane, methylhydrogencyclopolysiloxane, methylhydrogensiloxane-dimethylsiloxane cyclic copolymers, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, both end dimethylhydrogensiloxy-blocked methylhydrogensiloxane-dimethylsiloxane-diphenylsiloxane copolymers, copolymers of $(CH_3)_2HSiO_{1/2}$ units, $(CH_3)_3SiO_{1/2}$ units, and $SiO_{4/2}$ units, copolymers of $(CH_3)_2HSiO_{1/2}$ units and $SiO_{4/2}$ units, and copolymers of $(CH_3)_2HSiO_{1/2}$ units, $SiO_{4/2}$ units, and $(C_6H_5)_3SiO_{1/2}$ units.

The organohydrogenpolysiloxane (2) is blended in an amount of 0.1 to 300 parts, preferably 0.3 to 200 parts and more preferably 0.5 to 100 parts by weight per 100 parts by weight of the organopolysiloxane (1). Differently stated, the organohydrogenpolysiloxane (2) is blended in such an amount that about 0.3 to 20 mol, preferably about 0.5 to 5 mol, more preferably about 0.8 to 3 mol, and most preferably about 0.8 to 2.5 mol of silicon atom-attached hydrogen atoms (SiH groups) in component (2) are available per mol of silicon atom-attached alkenyl groups in component (1).

Component (3) is an addition reaction catalyst. Platinum group metal catalysts are typical, including platinum catalysts, for example, platinum black, platinic chloride, chloroplatinic acid, reaction products of chloroplatinic acid with monohydric alcohols, complexes of chloroplatinic acid with olefins, and platinum bisacetoacetate, palladium catalysts, and rhodium catalysts. The addition reaction catalyst (3) is used in a catalytic amount, typically about 0.1 to 1,000 parts, preferably about 0.5 to 1,000 parts, and more preferably about 1 to 500 parts by weight of platinum group metal per million parts by weight of components (1) and (2) combined.

The addition reaction curing type organopolysiloxane composition is comprised of components (1), (2) and (3) as mentioned above.

Reference is now made to the organic peroxide curing type organopolysiloxane composition. The organopolysiloxane having on the average at least two alkenyl groups in a molecule used herein as component (i) may be the same as component (1) defined above.

The organic peroxide (ii) used herein may be selected from conventional well-known ones, for example, benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butyl peroxide, t-butyl perbenzoate, 1,1-bis(t-butylperoxy)-3,3,5-trimethylcyclohexane, and 1,6-bis(t-butylperoxy-carboxy) hexane.

The organic peroxide is used in a catalytic amount, usually 0.01 to 10 parts by weight per 100 parts by weight of the organopolysiloxane (i).

The organic peroxide curing type organopolysiloxane composition is comprised of components (i) and (ii) as mentioned above.

The reinforcing silica fines (B) may be any of silica species commonly used in the art as a reinforcement for rubber.

Although any of silica species used in conventional silicone rubber compositions is useful, reinforcing silica fines having a specific surface area of at least 50 $m^2/g$ are preferred. It is advantageous to use precipitated silica, fumed silica and fired silica having a specific surface area of 50 to 400 $m^2/g$, with the fumed silica being especially advantageous for improved rubber strength. The reinforcing silica fines may be hydrophibized on surfaces with organosilicon compounds and other surface treating agents.

It is recommended that silica fines be previously treated directly in powder form. Any of well-known techniques may be used for the surface treatment. For example, untreated silica fine powder and a surface treating agent are admitted into a mechanical milling device closed under atmospheric pressure or a fluidized bed where they are mixed to effect surface treatment at room temperature or elevated temperature, optionally in the presence of an inert gas. If desired, a catalyst is used to promote the surface treatment. After thorough admixing, the powder is dried. The amount of the surface treating agent used is at least the theoretical amount calculated from the surface area to be covered with the agent.

Suitable treating agents include organosilazanes such as hexamethyldisilazane and divinyltetramethyldisilazane; silane coupling agents, for example, organoalkoxysilanes such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane and chloropropyltrimethoxysilane; and organosilicon compounds, for example, organopolysiloxanes such as polydimethylsiloxane and organohydrogenpolysiloxane. After surface treatment with such treating agents, the resulting hydrophobic silica fines are ready for use. Of these treating agents, the silane coupling agents and silazanes are preferred.

An appropriate amount of component (B) blended is 1 to 100 parts, more preferably 2 to 80 parts by weight per 100 parts by weight of component (A). Less amounts of component (B) fail to provide mechanical strength whereas excessive amounts of component (B) are difficult to fill, aggravating working and processing efficiency.

It is recommended that when the surface treated (hydrophobic) silica fines are admixed with component (A), the silica fines be further subjected to a hydrophobic treatment. That is, a second surface treating agent is used in the admixing step for imparting additional hydrophobic property to the once hydrophobized silica fines. Examples of the second surface treating agent include silane coupling agents and partial hydrolyzates thereof, organosilazanes, titanate coupling agents, organopolysiloxane fluids, and organohydrogenpolysiloxane fluids.

The second surface treating agents used herein are described in further detail. Exemplary silane coupling agents used herein are organoalkoxysilanes including methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, trimethylaminosilane, glycidoxypropyltrimethoxysilane, glycidoxypropylmethyldiethoxysilane, (epoxycyclohexyl)ethyltrimethoxysilane, methacryloxypropyltrimethoxysilane, methacryloxypropyltriethoxysilane, dimethyldimethoxysilane, divinyldimethoxysilane, and chloropropyltrimethoxysilane. Other silanes are also useful. Partial hydrolyzates of these silanes are also useful.

Exemplary organosilazanes used herein are hexamethyldisilazane, divinyltetramethyldisilazane and diphenyltetramethyldisilazane.

Exemplary titanate coupling agents used herein include tetraisopropyl titanate, tetra-n-butyl titanate, butyl titanate dimer, tetrastearyl titanate, triethanolamine titanate, titanium acetylacetonate, titanium ethylacetoacetate, titanium lactate, octylene glycol titanate, isopropyl tristearoyl titanate, isopropyl tridodecylbenzenesulfonyl titanate, isopropyl tris(dioctylpyrophosphate) titanate, bis(dioctylpyrophosphate) oxyacetate titanate, and bis(dioctylpyrophosphate) ethylene titanate.

The organopolysiloxane fluids used herein may be cyclic, linear, branched or network although linear or cyclic dimethylpolysiloxanes having a viscosity of 0.65 to 100,000 centistokes at 25° C. are preferred. The organohydrogenpolysiloxane fluids used herein may have any of cyclic, linear, branched and network molecular structures. Methylhydrogenpolysiloxanes of the following average formula (3) are desirably used.

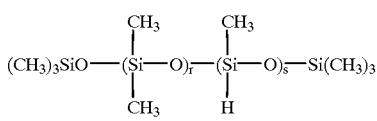
(3)

In the formula, r is an integer of 0 to 50, and s is an integer of 1 to 50. Siloxanes with r in excess of 50 are too viscous and difficult to treat therewith. Similarly, siloxanes with s in excess of 50 are too viscous and difficult to wet the surface.

The amount of the second surface treating agent used is at least the theoretical amount calculated from the surface area to be covered with the agent although amounts less than the theory are acceptable if no problems arise. Specifically, less than 0.1 parts by weight of the second agent per 100 parts by weight of the silica fines is ineffective whereas more than 20 parts by weight of the second agent is wasteful and adds to the cost. For this reason, 0.1 to 20 parts, especially 0.5 to 10 parts by weight of the second surface treating agent is preferably used per 100 parts by weight of the silica fines.

The second surface treatment may be effected on the silica fines as an independent step or together with the step of mixing with other components. Any of well-known techniques for surface treatment may be used. For example, the treated silica fine powder, other components and the second surface treating agent are admitted into a mechanical milling device under atmospheric pressure where they are mixed to effect surface treatment at room temperature or elevated temperature, optionally in the presence of an inert gas. If desired, a catalyst is used to promote the surface treatment.

The adhesive agent or adhesiveness-imparting component (C) is any of adhesive agents used in conventional addition curing type silicone adhesive compositions.

In a preferred embodiment, the adhesive agent (C) is an organic compound or organosilicon compound containing in a molecule at least one group selected from among Si—H, alkenyl, acrylic, methacrylic, epoxy, alkoxysilyl, carboxy anhydride, amino, amide and isocyanate groups, or a mixture thereof. More preferably, the adhesive agent is an organosilicon compound containing in a molecule at least one Si—H (i.e., hydrogen atom bound to a silicon atom) and/or alkenyl group and at least one group selected from among epoxy, alkoxysilyl, acrylic, methacrylic, ester, carboxy anhydride, amino and amide groups, or a mixture thereof. The Si—H groups and alkenyl groups (preferably, those of 2 to 6 carbon atoms such as vinyl, allyl, propenyl, butenyl and hexenyl) undergo crosslinking reaction with alkenyl groups on the alkenyl group-bearing organopolysiloxane and Si—H groups on the organohydrogenpolysiloxane in the above-described addition curing type organopolysiloxane composition, respectively.

Even more preferably, the adhesive agent (C) is an organosilicon compound of 1 to 30 silicon atoms, especially 2 to 20 silicon atoms, containing in a molecule at least one Si—H group and at least one phenyl or phenylene skeleton.

It is understood that those having both ester and aliphatic unsaturated groups are excluded from the adhesive agent (C).

Illustratively, suitable adhesive agents used herein are organosilicon compounds, typically linear or cyclic organosiloxane oligomers and organoalkoxysilanes of about 1 to 30 silicon atoms, preferably about 2 to 20 silicon atoms, and more preferably about 4 to 10 silicon atoms, having in a molecule at least one, often 1 to 10, especially 2 to 6 of Si—H groups (i.e., silicon atom-bound hydrogen atoms) and/or alkenyl groups as well as one or more groups selected from among epoxy groups (e.g. glycidoxy), alkoxysilyl groups (e.g., trimethoxysilyl, triethoxysilyl and methyldimethoxysilyl), acrylic, methacrylic, carboxy anhydride, amino, and amide groups.

More illustratively, suitable compounds containing epoxy, alkoxysilyl, alkenyl, amino, carboxy anhydride, acrylic, and methacrylic groups include non-silicon organic compounds having alkenyl and epoxy groups such as allyl glycidyl ether; and organoalkoxysilanes, for example, epoxy functional group-containing alkoxysilanes such as γ-glycidoxypropyltrimethoxysilane and β-(3,4-epoxycyclohexyl)ethyltrimethoxysilane; alkenyl group-containing alkoxysilanes such as vinyltrimethoxysilane, vinyltriethoxysilane and vinyltri(methoxyethoxy)silane; and amino group-containing alkoxysilanes such as γ-aminopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, and N-phenyl-γ-aminopropyltrimethoxysilane. Other useful compounds are organosiloxane oligomers which are shown below.

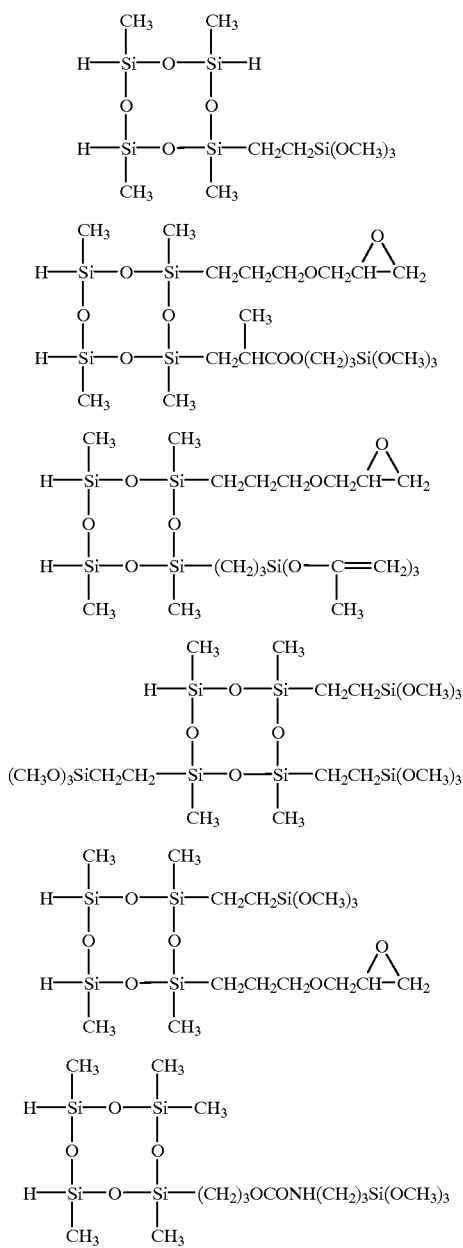

-continued

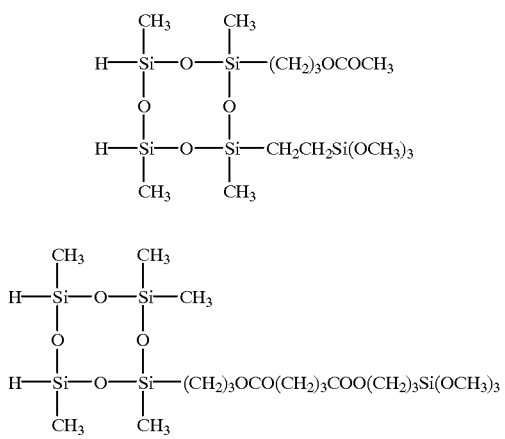

Another class of adhesive agent (C) includes non-silicon organic compounds containing a phenylene skeleton in a molecule and having at least two functional groups selected from epoxy, alkenyl and hydroxyl groups, which are exemplified below.

Herein, R is hydrogen or $C_1$–$C_3$ alkyl and n is 0 or an integer of 1 to 16.

The above-illustrated compounds are useful as the adhesive agent (C). Such a compound used as adhesive agent (C) exerts a sufficient bonding force, which has a potential of adhesion to metallic jigs including a mold which are used in molding of the composition. The use of a less adhesive material on the molding jig surface, as by applying Teflon resin coatings, is one solution to this problem, but is sometimes less reliable from the effective life standpoint. In such a situation, silicon compounds free of epoxy, alkoxy and carboxy anhydride groups are useful. More particularly, as the compound which effectively bonds with thermoplastic resins or compositions comprising the same, but not with metals, use may be made of organosilicon compounds including linear, branched or cyclic organosiloxane oligomers of about 1 to 30 silicon atoms, preferably about 2 to 20 silicon atoms, and especially about 4 to 12 silicon atoms, containing at least one, preferably about 1 to 20, and more preferably about 3 to 10, Si—H groups in a molecule and having a mono- to trivalent phenyl or phenylene skeleton not directly bound to a silicon atom. These compounds are exemplified below. Among others, those compounds having two or more phenyl or phenylene skeletons are especially preferred.

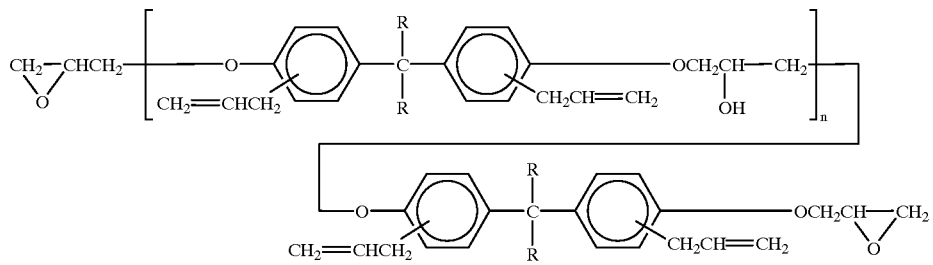

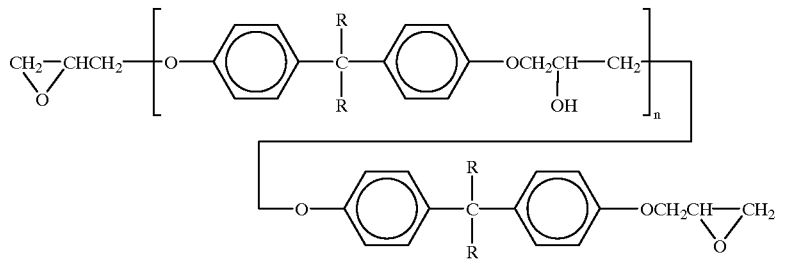

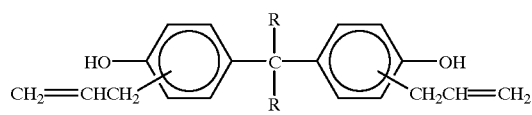

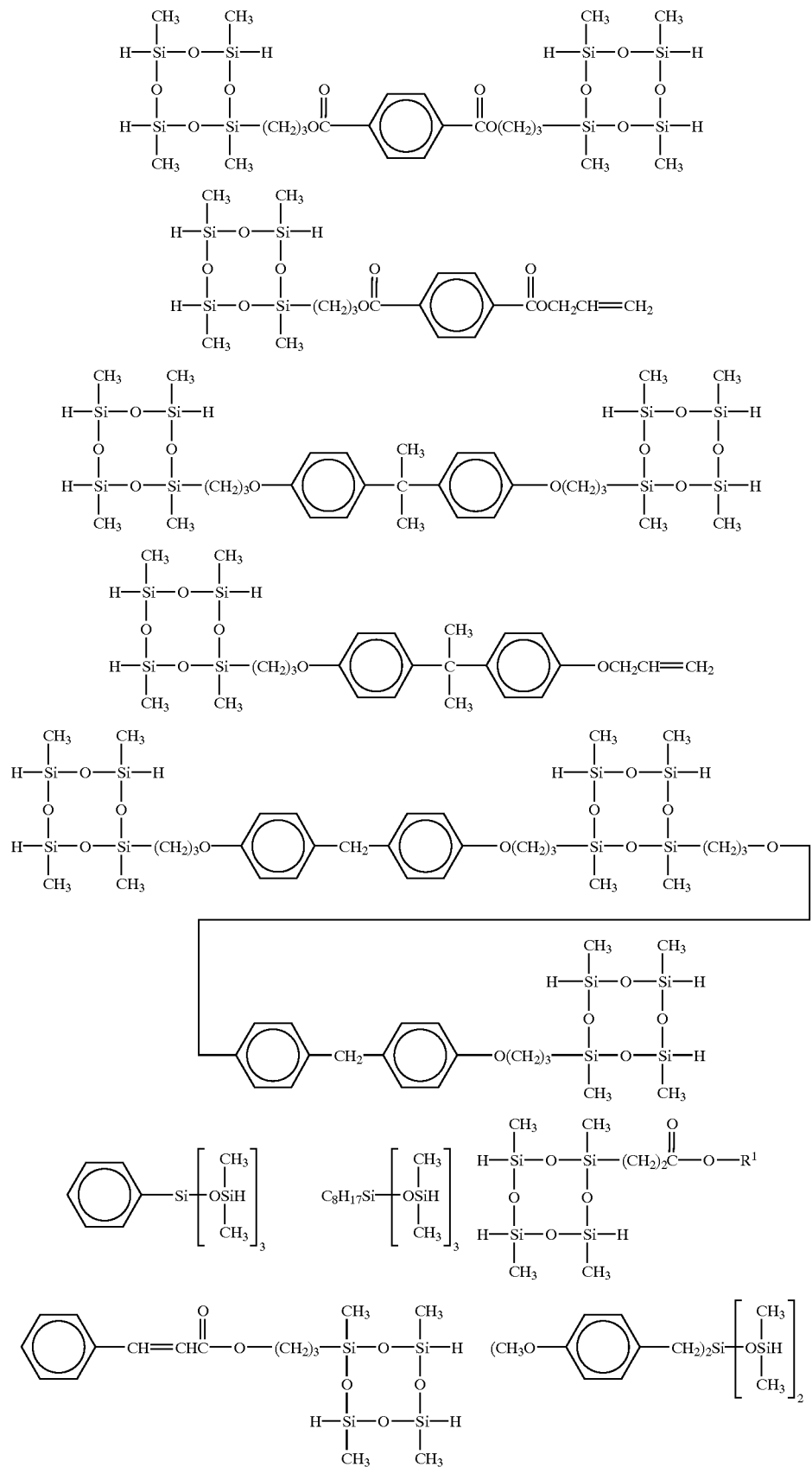

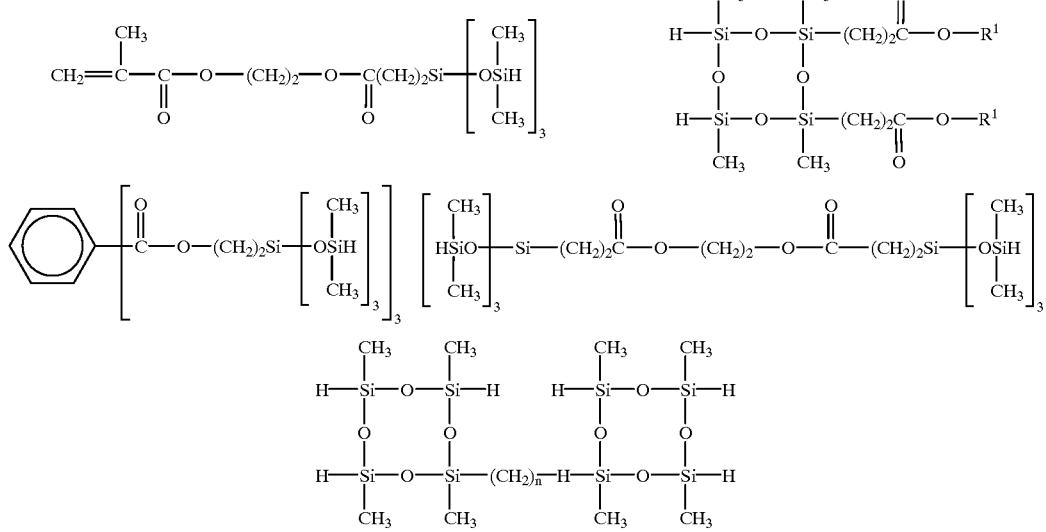

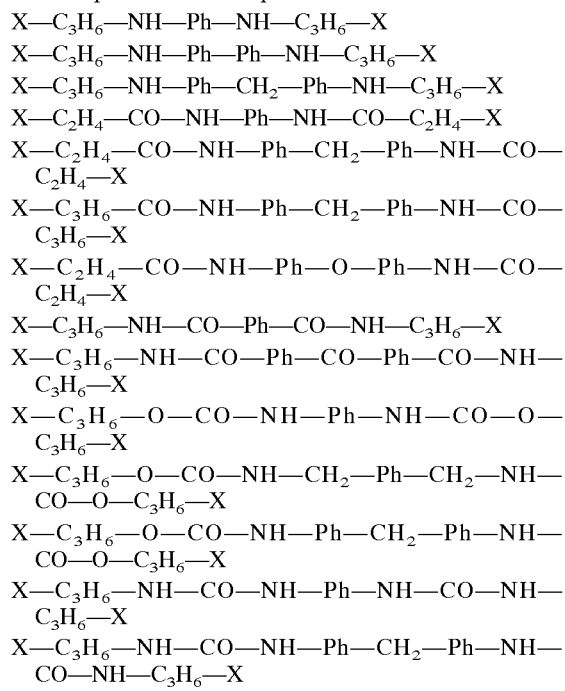

In the formulae, n is 2 to 30, and $R^1$ is as previously defined.

As the adhesive agent compounds having amino and amide groups, art-recognized compounds are useful. Other useful compounds are exemplified below.

X—$C_3H_6$—NH—Ph—NH—$C_3H_6$—X
X—$C_3H_6$—NH—Ph—Ph—NH—$C_3H_6$—X
X—$C_3H_6$—NH—Ph—$CH_2$—Ph—NH—$C_3H_6$—X
X—$C_2H_4$—CO—NH—Ph—NH—CO—$C_2H_4$—X
X—$C_2H_4$—CO—NH—Ph—$CH_2$—Ph—NH—CO—$C_2H_4$—X
X—$C_3H_6$—CO—NH—Ph—$CH_2$—Ph—NH—CO—$C_3H_6$—X
X—$C_2H_4$—CO—NH—Ph—O—Ph—NH—CO—$C_2H_4$—X
X—$C_3H_6$—NH—CO—Ph—CO—NH—$C_3H_6$—X
X—$C_3H_6$—NH—CO—Ph—CO—Ph—CO—NH—$C_3H_6$—X
X—$C_3H_6$—O—CO—NH—Ph—NH—CO—O—$C_3H_6$—X
X—$C_3H_6$—O—CO—NH—$CH_2$—Ph—$CH_2$—NH—CO—O—$C_3H_6$—X
X—$C_3H_6$—O—CO—NH—Ph—$CH_2$—Ph—NH—CO—O—$C_3H_6$—X
X—$C_3H_6$—NH—CO—NH—Ph—NH—CO—NH—$C_3H_6$—X
X—$C_3H_6$—NH—CO—NH—Ph—$CH_2$—Ph—NH—CO—NH—$C_3H_6$—X

Note that X is 1,3,5,7-tetramethyl-3,5,7-trihydrocyclotetrasiloxane, and Ph is phenyl or phenylene.

The adhesive agent compounds may be used alone or in admixture of any.

An appropriate amount of the adhesive agent (C) used is 0.1 to 50 parts, preferably 0.2 to 30 parts by weight per 100 parts by weight of the organopolysiloxane composition (A). Less than 0.1 part of the adhesive agent fails to achieve adhesion whereas more than 50 parts of the adhesive agent can detract from physical properties.

Component (D) is a compound having at least one ester group in a molecule. It is an effective aid to the adhesive agent (C) and essential to improve the bonding force. Although the exact mechanism is not well understood, it is believed that when the ester group-containing compound is added to the adhesive agent in order to provide selectivity to the adherend to which the composition is bonded and joined, the adhesive agent which is more soluble in the ester group-containing compound than in the siloxane polymer is localized in the ester group-containing compound, which allows the adhesive agent to readily migrate to the bonding interface between the siloxane polymer and the adherend.

The compound having at least one ester group in a molecule is not critical as long as it has an ester group. It is preferred that the compound additionally have at least one aliphatic unsaturated group in a molecule and/or do not have a siloxane structure in a molecule. Preferred aliphatic unsaturated groups are lower alkenyl groups of about 2 to 6 carbon atoms, especially about 2 to 4 carbon atoms, such as vinyl (i.e., acrylate structure), isopropenyl (i.e., methacrylate structure), allyl, propenyl, and butenyl. Illustrative non-limiting examples include alkyl acrylates such as butyl acrylate, octyl acrylate, and dodecyl acrylate; aromatic ring-bearing acrylates such as phenyl acrylate, benzyl acrylate and 2-ethylphenol acrylate; alkyl and aromatic ring-bearing methacrylates, alkyl and aromatic ring-bearing vinyl acetates, alkyl allyl esters, aromatic ring-bearing allyl esters derived from benzoic acid, terephthalic acid, tetrahydrophthalic acid and pyromellitic acid; esters of saturated and unsaturated polyfunctional carboxylic acids derived from allyl alcohol and methacryl alcohol; acrylic silanes and methacrylic silanes. Of these, acrylates and allyl esters derived from unsaturated monohydric alcohols are preferred. It is especially preferred that the aliphatic unsaturated group be at an end of the molecular chain.

An appropriate amount of component (D) blended is 0.05 to 20 parts, and preferably 0.1 to 10 parts by weight per 100 parts by weight of component (A). Less than 0.05 part of component (D) is too small to enhance the bonding force whereas more than 20 parts of component (D) rather detracts from the bonding force.

Besides the essential components, there may be added another organosilicon compound having a siloxane skeleton which is incompatible with component (A). Included are phenyl group-bearing silicone oils, fluorosilicone oils, silicone-modified perfluoroalkyl ether compounds, polyether-modified silicone oils, amino-modified silicone oils, amide-modified silicone oils, and urethane-modified silicone oils.

To impart an oil bleeding ability to the inventive composition, at least one non-functional organopolysiloxane having phenyl groups may be added in an amount of about 1 to 20 parts per 100 parts by weight of component (A).

In addition to the above-described components, various additives may be added to the silicone rubber adhesive composition of the invention. Such additives are selected for a particular purpose. Typical additives are metal oxides and compounds thereof such as titanium oxide, iron oxide, cerium oxide, vanadium oxide, cobalt oxide, chromium oxide, and manganese oxide, and inorganic fillers, for example, quartz powder, diatomaceous earth, calcium carbonate, magnesium carbonate, alumina, and carbon. Also, pigments, heat resistance modifiers, flame retardants, plasticizers, and reaction regulators may be added insofar as the desired properties are not impaired. These optional additives may be added in conventional amounts that would not hamper the benefits of the invention.

In the embodiment wherein the addition curing type organopolysiloxane composition is used as (A), an addition reaction regulator may be added insofar as the objects of the invention are not impaired. Suitable regulators are vinyl group-bearing organopolysiloxanes such as vinylcyclotetrasiloxane, triallyl isocyanate, alkyl maleates, acetylene alcohols such as ethynyl cyclohexanol, silanes, modified siloxanes, hydroperoxides, tetramethylethylenediamine, benzotriazole and mixtures of any.

The silicone rubber adhesive composition of the invention can be obtained simply by uniformly admixing the above-described components (A) to (D) and optional components at room temperature. Preferably, component (B) is mixed with component (A) excluding (2) and (3) or (ii) in a planetary mixer or kneader where they are heat treated at a temperature of 100 to 200° C. for 1 to 4 hours, during which period the second surface treating agent may be added. Thereafter, at room temperature, the mixture is admixed with components (2) and (3) or (ii) of component (A) and components (C) and (D), thereby obtaining the composition. Any desired molding technique may be selected depending on the viscosity of the mixture or composition. Any of casting, compression molding, injection molding, extrusion molding, and transfer molding techniques is useful. The composition may be heat molded, typically at a temperature of about 60 to 200° C. for about 10 seconds to about 24 hours.

The silicone rubber adhesive composition of the invention is advantageously used in forming integrally molded articles with organic resins. The thermoplastic resins used in combination with the silicone rubber adhesive composition include polymerized or polycondensed olefins, for example, acrylonitrile-butadiene-styrene (ABS) resins, styrene resins, polyethylene resins, polypropylene resins, acrylic resins, polycarbonate (PC) resins, polyethylene terephthalate resins, polybutylene terephthalate (PBT) resins, polyphenylene oxide resins, polyphenylene sulfide resins, polysulfone resins, nylon resins, aromatic polyamide resins, polyimide resins, liquid crystal resins, and mixtures thereof.

Several methods may be employed in integrally molding the uncured silicone rubber adhesive composition on the thermoplastic resin. In one method, a desired shape of the uncured silicone rubber adhesive composition is placed on a preform of the thermoplastic resin, followed by heating at a temperature below the melting temperature of the thermoplastic resin. Another method is by placing the uncured silicone rubber adhesive composition on a preform of the thermoplastic resin, followed by compression at a temperature below the melting temperature of the thermoplastic resin. A further method is by previously injection molding the thermoplastic resin in a mold by means of an injection molding machine, and heat injecting the silicone rubber adhesive composition into the mold. It is noted that the preform of the thermoplastic resin is conveniently prepared by a well-known method involving pelletizing the thermoplastic resin, injecting the pellets into a mold heated above the softening point of the thermoplastic resin, then cooling the mold below the softening point of the thermoplastic resin. In these molding steps, customary molding machines such as injection molding machines and transfer molding machines can be employed.

The silicone rubber adhesive composition in the uncured state may take the form of liquid, putty or paste, with the liquid or paste form being preferred for ease of molding. In order that the silicone rubber adhesive composition firmly bond with the thermoplastic resin, the conditions for curing the silicone rubber adhesive composition should include a temperature and time which do not cause deformation, melting and degradation of the thermoplastic resin. Usually integrally molded articles can be formed under curing conditions of 100 to 150° C. and about 0.2 to 30 minutes, especially about 0.4 to 10 minutes, although suitable curing conditions vary with the type of resin.

In connection with an integrally molded article of a silicone rubber adhesive composition and a thermoplastic resin, the silicone rubber adhesive composition of the invention is easily moldable within a short time by injection molding, suitable in primerless molding, and bondable with the thermoplastic resin. A bond between the silicone rubber and the thermoplastic resin is achieved without a need for modification of the resin. The integrally molded articles are useful in the electric, electronic, automotive, precision machinery and building fields.

EXAMPLE

Examples of the invention are given below by way of illustration and not by way of limitation. All parts are by weight.

Preparation Examples of Silicone Rubber Compositions

As shown in Tables 1 and 2, a dimethylpolysiloxane blocked with a dimethylvinylsiloxy group at each end and having a viscosity of 30,000 centipoise at 25° C. as component (1) of component (A) and fumed silica having a specific surface area of 200 m$^2$/g as component (B) were blended together with 8 parts per 100 parts of component (1) of hexamethyldisilazane and uniformly admixed in a kneader/mixer, and further heat admixed at 150° C. for one hour, obtaining a silicone rubber base. To the silicone rubber base were added dimethylhydrogenpolysiloxane of the average formula (4):

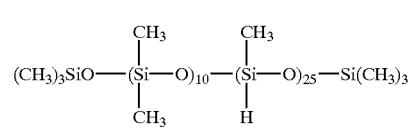

(4)

as component (2) in component (A), a 1% 2-ethylhexanol solution of chloroplatinic acid as component (3), and a 50% ethanol solution of ethynyl cyclohexanol as a reaction regulator. Further, adhesive agent I, II or III as component (C) and ester group-containing compound <1> to <5> as component (D) were added. They were uniformly mixed, yielding a silicone rubber composition.

Component (C)

Adhesive agent I

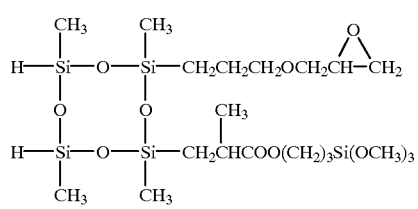

(I)

Adhesive agent II

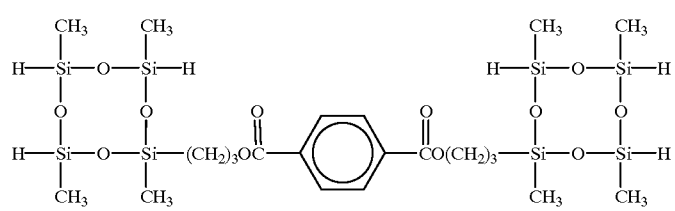

(II)

Adhesive agent III

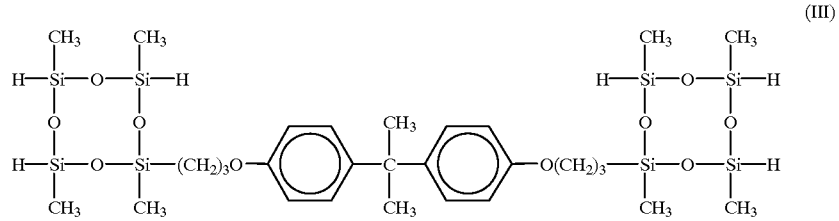

(III)

Component (D)
<1> lauryl acrylate
<2> 2-phenoxyethyl acrylate
<3> allyl benzoate
<4> tetraallyl pyromellitate
<5> KBM5103 (trade name of γ-acryloxypropyl-trimethoxysilane by Shin-Etsu Chemical Co., Ltd.)

Example 1

A thermoplastic resin injection molding machine was used. A polycarbonate (PC) resin having a number average molecular weight of about 10,000, polybutylene terephthalate (PBT) resin having a number average molecular weight of about 20,000, polymethyl methacrylate (PMMA) resin, polyphenylene sulfide (PPS) resin, nylon 6-6 (PA66), and polyphthalamide (PPA) each were admitted into the machine, plasticized at 290° C. and injected into a plurality of cavities in a multiple sheet mold, forming resin sheets of 25 mm×100 mm×2 mm (thick). The injection conditions included an injection time of 6 seconds, a cooling time of 30 seconds, an injection pressure of 1,000 kg/cm², a clamping pressure of 35 ton, and a cavity temperature of 100° C.

Each resin sheet and a chromium-plated metal plate of the same size were secured to a tensile shear bond strength test specimen-forming jig. An appropriate amount of the silicone rubber composition obtained in the above Preparation Example using adhesive agent I as component (C) and compound <1> as component (D) was flowed into the jig, which was heated for 10 minutes in a thermostat tank at 120° C. for curing. A test specimen as shown in FIG. 1 was obtained in this way and examined for bond strength according to JIS K-6850.

Figure 1B:
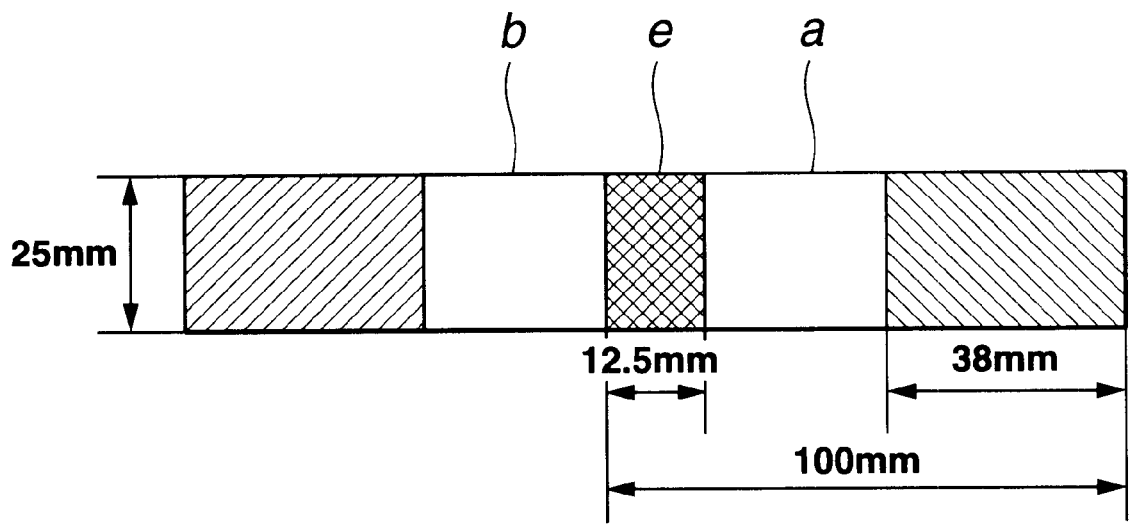
FIG. 1B being a plan view.

In FIG. 1, "a" and "b" designate resin sheets, "c" and "d" are holder clamps, and "e" is the cured silicone rubber composition.

Example 2

The resins used in Example 1 each were admitted into the injection molding machine, plasticized at 290° C. and injected into a plurality of cavities in the multiple sheet mold, forming resin sheets of 25 mm×100 mm×2 mm (thick). The injection conditions included an injection time of 6 seconds, a cooling time of 30 seconds, an injection pressure of 1,000 kg/cm², a clamping pressure of 35 ton, and a cavity temperature of 100° C.

Each resin sheet and a chromium-plated metal plate of the same size were secured to the tensile shear bond strength test specimen-forming jig. An appropriate amount of the silicone rubber composition obtained in the above Preparation Example using adhesive agent II as component (C) and compound <1> as component (D) was flowed into the jig, which was heated for 10 minutes in a thermostat tank at 120° C. for curing. A test specimen as shown in FIG. 1 was obtained in this way and examined for bond strength according to JIS K-6850.

Example 3

The resins used in Example 1 each were admitted into the injection molding machine, plasticized at 290° C. and injected into a plurality of cavities in the multiple sheet mold, forming resin sheets of 25 mm×100 mm×2 mm (thick). The injection conditions included an injection time of 6 seconds, a cooling time of 30 seconds, an injection pressure of 1,000 kg/cm$^2$, a clamping pressure of 35 ton, and a cavity temperature of 100° C.

Each resin sheet and a chromium-plated metal plate of the same size were secured to the tensile shear bond strength test specimen-forming jig. An appropriate amount of the silicone rubber composition obtained in the above Preparation Example using adhesive agent III as component (C) and compound <1> as component (D) was flowed into the jig, which was heated for 10 minutes in a thermostat tank at 120° C. for curing. A test specimen as shown in FIG. 1 was obtained in this way and examined for bond strength according to JIS K-6850.

Example 4

The resins used in Example 1 each were admitted into the injection molding machine, plasticized at 290° C. and injected into a plurality of cavities in the multiple sheet mold, forming resin sheets of 25 mm×100 mm×2 mm (thick). The injection conditions included an injection time of 6 seconds, a cooling time of 30 seconds, an injection pressure of 1,000 kg/cm$^2$, a clamping pressure of 35 ton, and a cavity temperature of 100° C.

Each resin sheet and a chromium-plated metal plate of the same size were secured to the tensile shear bond strength test specimen-forming jig. An appropriate amount of the silicone rubber composition obtained in the above Preparation Example using adhesive agent III as component (C) and compound <2> as component (D) was flowed into the jig, which was heated for 10 minutes in a thermostat tank at 120° C. for curing. A test specimen as shown in FIG. 1 was obtained in this way and examined for bond strength according to JIS K-6850.

Example 5

The resins used in Example 1 each were admitted into the injection molding machine, plasticized at 290° C. and injected into a plurality of cavities in the multiple sheet mold, forming resin sheets of 25 mm×100 mm×2 mm (thick). The injection conditions included an injection time of 6 seconds, a cooling time of 30 seconds, an injection pressure of 1,000 kg/cm$^2$, a clamping pressure of 35 ton, and a cavity temperature of 100° C.

Each resin sheet and a chromium-plated metal plate of the same size were secured to the tensile shear bond strength test specimen-forming jig. An appropriate amount of the silicone rubber composition obtained in the above Preparation Example using adhesive agent III as component (C) and compound <3> as component (D) was flowed into the jig, which was heated for 10 minutes in a thermostat tank at 120° C. for curing. A test specimen as shown in FIG. 1 was obtained in this way and examined for bond strength according to JIS K-6850.

Example 6

The resins used in Example 1 each were admitted into the injection molding machine, plasticized at 290° C. and injected into a plurality of cavities in the multiple sheet mold, forming resin sheets of 25 mm×100 mm×2 mm (thick). The injection conditions included an injection time of 6 seconds, a cooling time of 30 seconds, an injection pressure of 1,000 kg/cm$^2$, a clamping pressure of 35 ton, and a cavity temperature of 100° C.

Each resin sheet and a chromium-plated metal plate of the same size were secured to the tensile shear bond strength test specimen-forming jig. An appropriate amount of the silicone rubber composition obtained in the above Preparation Example using adhesive agent III as component (C) and compound <4> as component (D) was flowed into the jig, which was heated for 10 minutes in a thermostat tank at 120° C. for curing. A test specimen as shown in FIG. 1 was obtained in this way and examined for bond strength according to JIS K-6850.

Example 7

The resins used in Example 1 each were admitted into the injection molding machine, plasticized at 290° C. and injected into a plurality of cavities in the multiple sheet mold, forming resin sheets of 25 mm×100 mm×2 mm (thick). The injection conditions included an injection time of 6 seconds, a cooling time of 30 seconds, an injection pressure of 1,000 kg/cm$^2$, a clamping pressure of 35 ton, and a cavity temperature of 100° C.

Each resin sheet and a chromium-plated metal plate of the same size were secured to the tensile shear bond strength test specimen-forming jig. An appropriate amount of the silicone rubber composition obtained in the above Preparation Example using adhesive agent III as component (C) and compound <5> as component (D) was flowed into the jig, which was heated for 10 minutes in a thermostat tank at 120° C. for curing. A test specimen as shown in FIG. 1 was obtained in this way and examined for bond strength according to JIS K-6850.

Comparative Example 1

The resins used in Example 1 each were admitted into the injection molding machine, plasticized at 290° C. and injected into a plurality of cavities in the multiple sheet mold, forming resin sheets of 25 mm×100 mm×2 mm (thick). The injection conditions included an injection time of 6 seconds, a cooling time of 30 seconds, an injection pressure of 1,000 kg/cm$^2$, a clamping pressure of 35 ton, and a cavity temperature of 100° C.

Each resin sheet and a chromium-plated metal plate of the same size were secured to the tensile shear bond strength test specimen-forming jig. An appropriate amount of the silicone rubber composition obtained in the above Preparation Example without adding the adhesive agent (C) and component (D) was flowed into the jig, which was heated for 10 minutes in a thermostat tank at 120° C. for curing. A test specimen as shown in FIG. 1 was obtained in this way and examined for bond strength according to JIS K-6850.

Comparative Example 2

The resins used in Example 1 each were admitted into the injection molding machine, plasticized at 290° C. and injected into a plurality of cavities in the multiple sheet mold, forming resin sheets of 25 mm×100 mm×2 mm (thick). The injection conditions included an injection time of 6 seconds, a cooling time of 30 seconds, an injection pressure of 1,000 kg/cm$^2$, a clamping pressure of 35 ton, and a cavity temperature of 100° C.

Each resin sheet and a chromium-plated metal plate of the same size were secured to the tensile shear bond strength test specimen-forming jig. An appropriate amount of the silicone rubber composition obtained in the above Preparation Example using compound <1> as component (D), but in the absence of the adhesive agent (C) was flowed into the jig, which was heated for 10 minutes in a thermostat tank at 120° C. for curing. A test specimen as shown in FIG. 1 was obtained in this way and examined for bond strength according to JIS K-6850.

Comparative Example 3

The resins used in Example 1 each were admitted into the injection molding machine, plasticized at 290° C. and injected into a plurality of cavities in the multiple sheet mold, forming resin sheets of 25 mm×100 mm×2 mm (thick). The injection conditions included an injection time of 6 seconds, a cooling time of 30 seconds, an injection pressure of 1,000 kg/cm², a clamping pressure of 35 ton, and a cavity temperature of 100° C.

Each resin sheet and a chromium-plated metal plate of the same size were secured to the tensile shear bond strength test specimen-forming jig. An appropriate amount of the silicone rubber composition obtained in the above Preparation Example using adhesive agent III as component (C), but in the absence of component (D) was flowed into the jig, which was heated for 10 minutes in a thermostat tank at 120° C. for curing. A test specimen as shown in FIG. 1 was obtained in this way and examined for bond strength according to JIS K-6850.

Example 8

Figure 2:
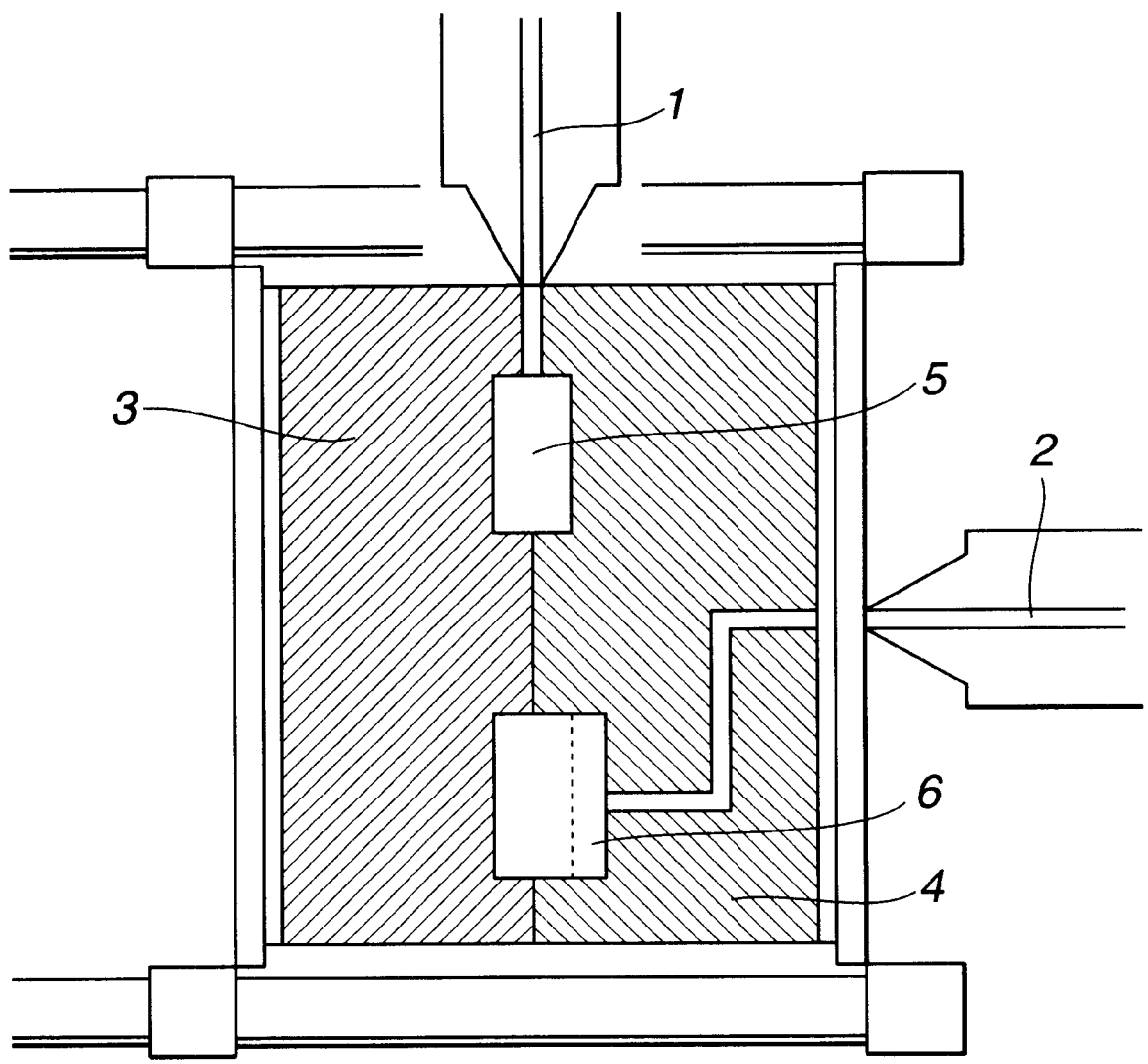
FIG. 2 is a schematic view of a two-color injection molding machine.

Molding of the resin and the silicone rubber composition used in Example 3 was carried out using a two-color injection molding machine equipped with two injection cylinders. In this molding machine, nozzles 1 and 2 of the injection cylinders are connected to a mold as shown in FIG. 2. The nozzle 1 is aligned with a mold parting line whereas the nozzle 2 is designed to inject the material into a cavity from its center on the right side of the mold. The mold consists of a left mold half 3 and a right mold half 4. Two recesses are formed in opposed surfaces of the mold halves 3 and 4 so that the recesses may define two cavities 5 and 6 when the mold halves are mated together.

Figure 3:
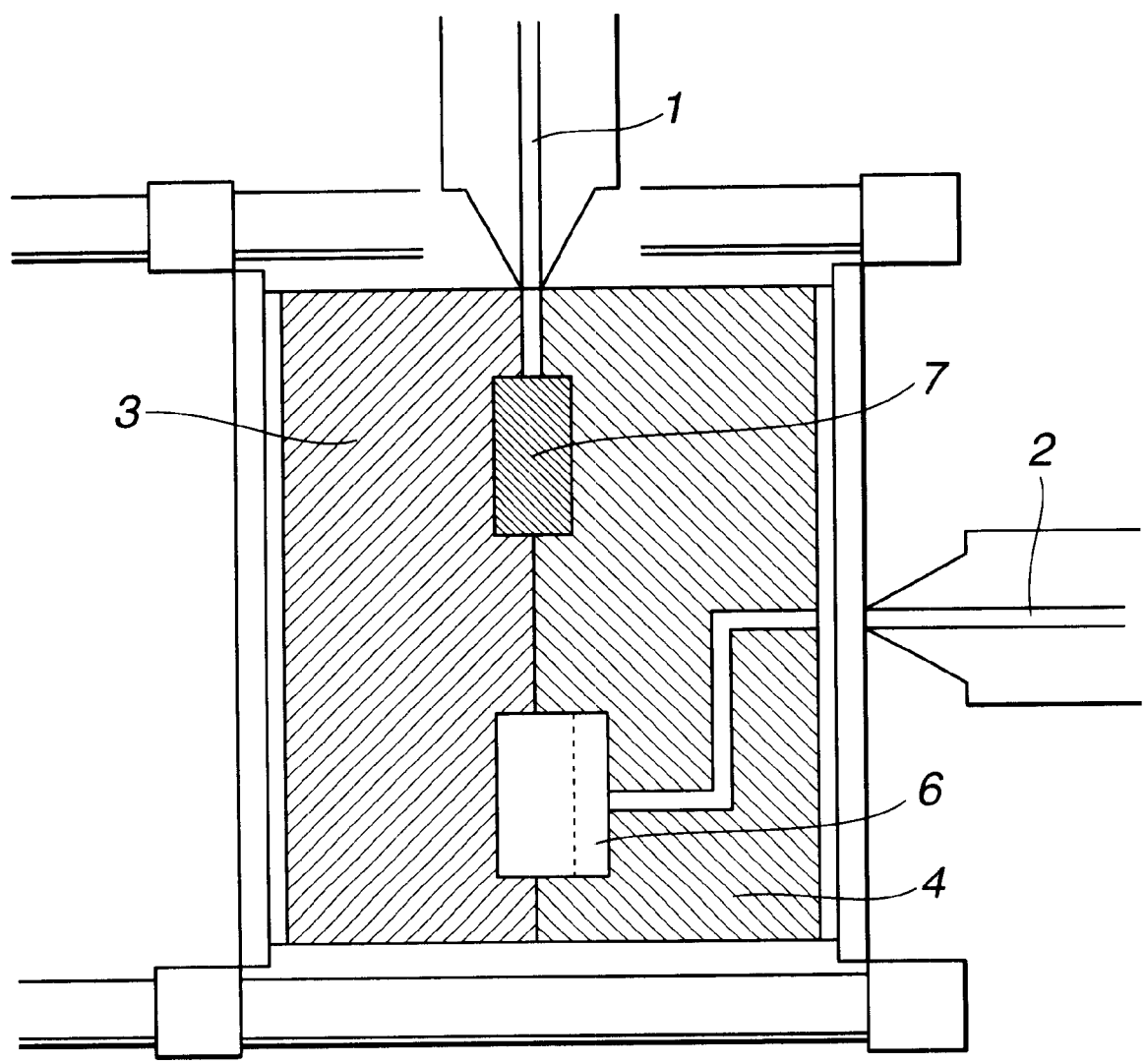
FIG. 3 is a view similar to FIG. 2, showing the resin injected into a first cavity.

Using this injection molding machine, each resin was melted at 290° C. and injected into the first cavity 5 through the nozzle 1 to form a resin sheet 7 (see FIG. 3). The injection conditions included an injection time of 6 seconds, a cooling time of 35 seconds, and a temperature of 100° C. for both the cavity 5 and the left mold half 3.

Figure 4:
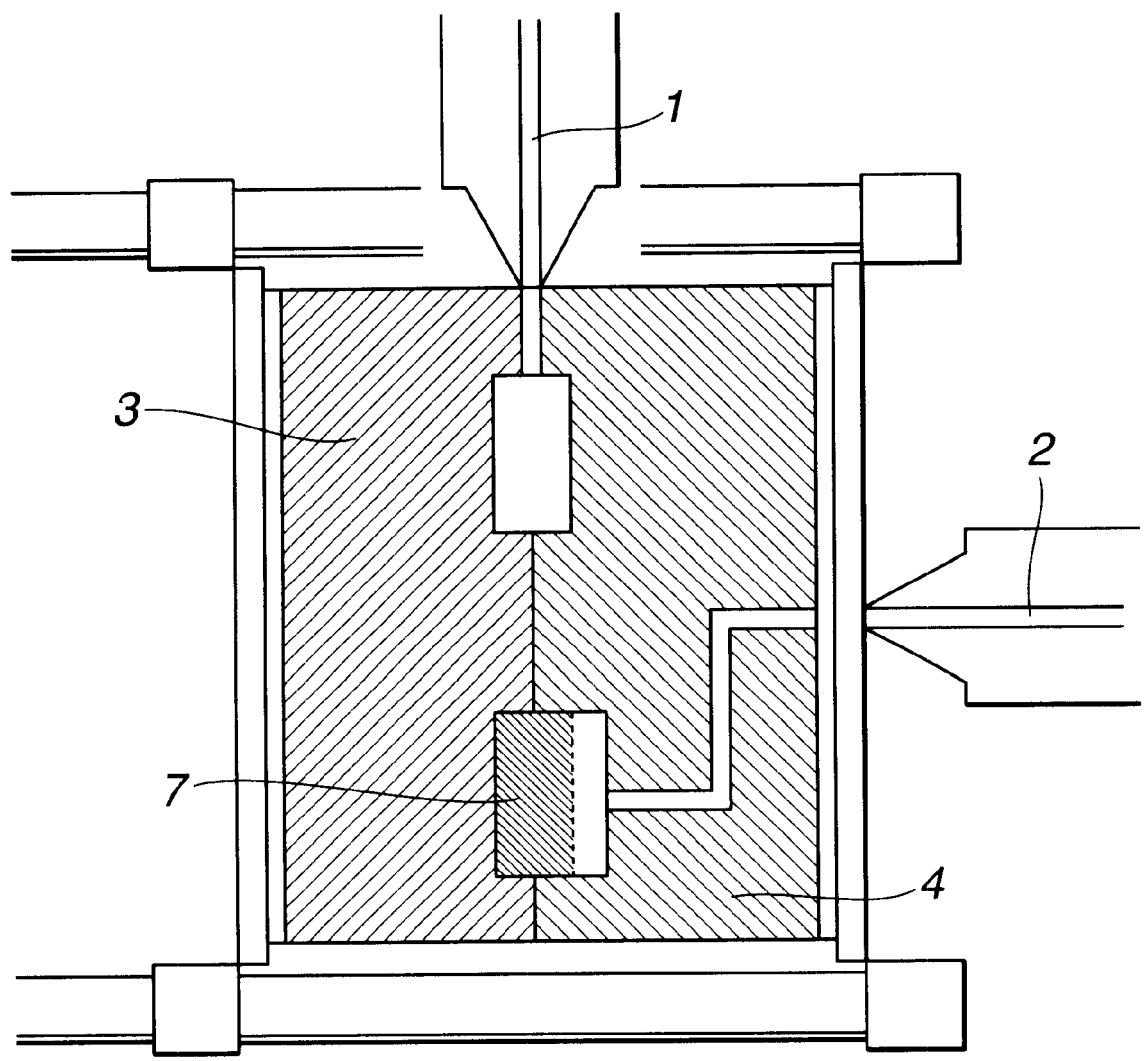
FIG. 4 is a view similar to FIG. 2, showing the molded resin sheet set in a second cavity.

Next, the right mold half 4 was moved apart to open the mold, the left mold half 3, with the molded resin sheet 7 held in its recess, was rotated 180°, and the right mold half 4 was moved back. The mold halves were clamped again. At this point, a cavity for molding a silicone rubber sheet was defined between the (lower) recess in the right mold half 4 and the opposing surface of the molded resin sheet 7 as shown in FIG. 4.

Figure 5:
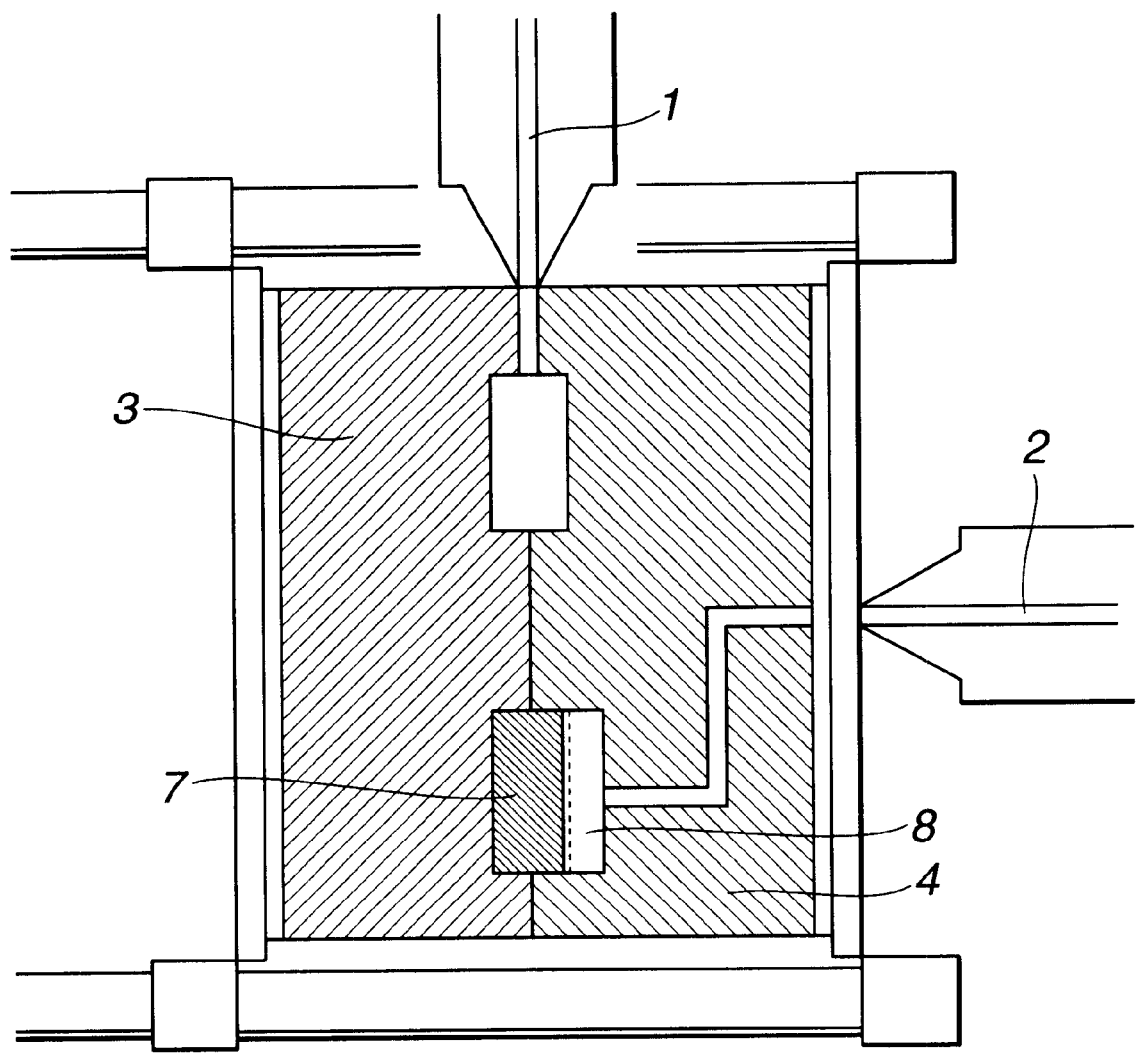
FIG. 5 is a view similar to FIG. 2, showing the silicone rubber composition injected into the second cavity.

In this state, the silicone rubber composition used in Example 1 (whose recipe is shown in Tables 1 and 2) was injected from the nozzle 2 against the surface of the molded resin sheet 7, forming a rubber sheet 8 (see FIG. 5). The injection conditions included an injection time of 6 seconds, a curing time of 90 seconds, a temperature of 100° C. for the left mold half 3, and a temperature of 120° C. for the right mold half 4.

Figure 6:
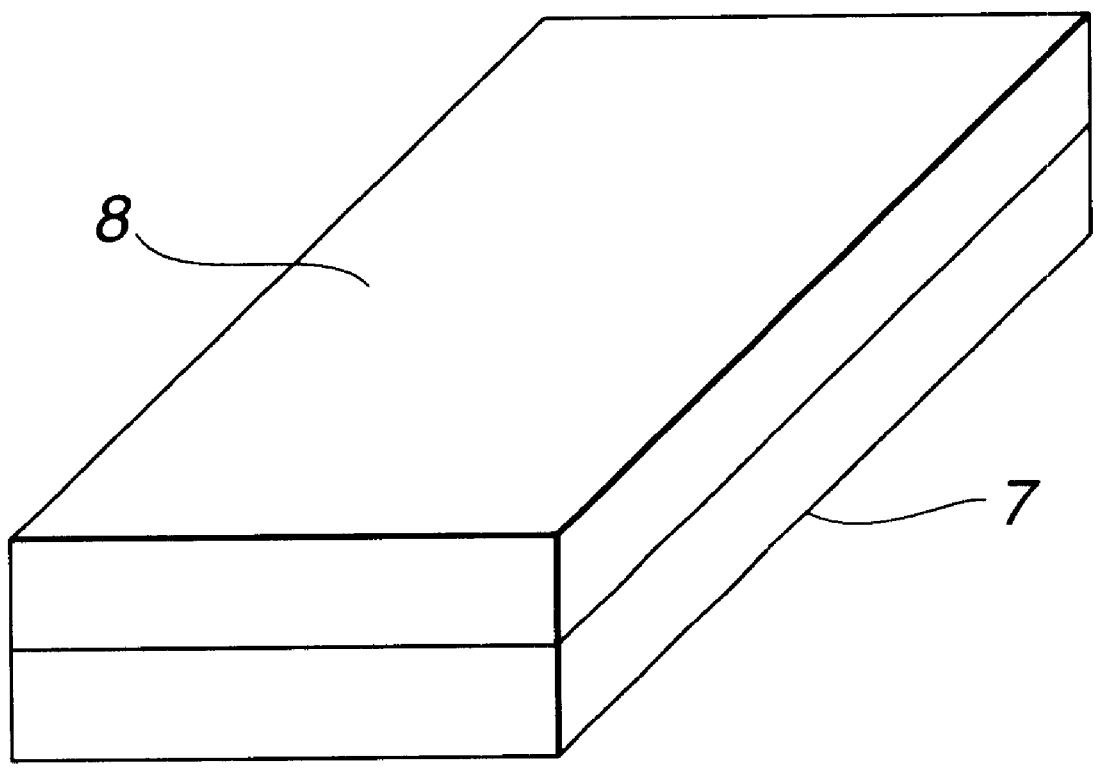
FIG. 6 is a perspective view of the resulting composite body of resin and rubber sheets.

In this way, there was obtained a composite body of the resin sheet 7 bonded to the rubber sheet 8 as shown in FIG. 6. It is noted that both resin and rubber sheets were dimensioned 2.5 mm×150 mm×2 mm (thick). Mold release, dimensional precision and productivity were satisfactory. Adhesion was also examined.

The test results are shown in Tables 1 and 2.

It is noted that the bond strength was examined by a tensile shear bond strength test according to JIS K-6850. Specimens showing a bond strength of 25 kgf/cm² or higher were rated "Bonded."

TABLE 1

| | | | Example | | | | | | | |
|---|---|---|---|---|---|---|---|---|---|---|
| Component (pbw) | | | 1 | 2 | 3 | 4 | 5 | 6 | 7 | 8 |
| (A) (1) Organopolysiloxane | | | 100 | 100 | 100 | 100 | 100 | 100 | 100 | 100 |
| (2) Organohydrogenpolysiloxane | | | 5 | 5 | 5 | 5 | 5 | 5 | 5 | 5 |
| (3) Platinum catalyst | | | 0.1 | 0.1 | 0.1 | 0.1 | 0.1 | 0.1 | 0.1 | 0.1 |
| Reaction regulator | | | 0.05 | 0.05 | 0.05 | 0.05 | 0.05 | 0.05 | 0.05 | 0.05 |
| (B) Silica fines | | | 40 | 40 | 40 | 40 | 40 | 40 | 40 | 40 |
| (C) Adhesive agent I | | | 5 | | | | | | | |
| Adhesive agent II | | | | 5 | | | | | | |
| Adhesive agent III | | | | | 5 | 5 | 5 | 5 | 5 | 5 |
| (D) Ester group-containing compound <1> | | | 5 | 5 | 5 | | | | | 5 |
| Ester group-containing compound <2> | | | | | | 5 | | | | |
| Ester group-containing compound <3> | | | | | | | 5 | | | |
| Ester group-containing compound <4> | | | | | | | | 5 | | |
| Ester group-containing compound <5> | | | | | | | | | 5 | |
| Adhesion | | | | | | | | | | |
| Resin | PC | | Bonded | Bonded | Bonded | Bonded | Bonded | Bonded | Bonded | Bonded |
| | PBT | | Bonded | Bonded | Bonded | Bonded | Bonded | Bonded | Bonded | Bonded |
| | PMMA | | Bonded | Bonded | Bonded | Bonded | Bonded | Bonded | Bonded | Bonded |
| | PPS | | Bonded | Bonded | Bonded | Bonded | Bonded | Bonded | Bonded | Bonded |
| | PA66 | | Bonded | Bonded | Bonded | Bonded | Bonded | Bonded | Bonded | Bonded |
| | PPA | | Bonded | Bonded | Bonded | Bonded | Bonded | Bonded | Bonded | Bonded |
| Metal (mold) | Cr-plated | | No | No | No | No | No | No | No | No |

TABLE 2

|  |  | Comparative Example | | |
|---|---|---|---|---|
| Component (pbw) | | 1 | 2 | 3 |
| (A) (1) Organopolysiloxane | | 100 | 100 | 100 |
| (2) Organohydrogenpolysiloxane | | 5 | 5 | 5 |
| (3) Platinum catalyst | | 0.1 | 0.1 | 0.1 |
| Reaction regulator | | 0.05 | 0.05 | 0.05 |
| (B) Silica fines | | 40 | 40 | 40 |
| (C) Adhesive agent I | | | | |
| Adhesive agent II | | | | |
| Adhesive agent III | | | | 5 |
| (D) Ester group-containing compound <1> | | | 5 | |
| Ester group-containing compound <2> | | | | |
| Ester group-containing compound <3> | | | | |
| Ester group-containing compound <4> | | | | |
| Ester group-containing compound <5> | | | | |
| Adhesion | | | | |
| Resin | PC | No | No | Bonded |
|  | PBT | No | No | Bonded |
|  | PMMA | No | No | No |
|  | PPS | No | No | No |
|  | PA66 | No | No | No |
|  | PPA | No | No | No |
| Metal (mold) | Cr-plated | No | No | No |

It is evident from Tables 1 and 2 that silicone rubber adhesive compositions within the scope of the invention can be briefly cured to various resins to form integrally molded articles in which the silicone rubber is firmly bonded to the resin. Additionally mold release, dimensional precision and productivity are satisfactory.

Japanese Patent Application No. 2000-209699 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone rubber adhesive composition comprising (A) 100 parts by weight of a heat curable organopolysiloxane composition, (B) 1 to 100 parts by weight of reinforcing silica fines, (C) 0.1 to 50 parts by weight of an adhesive agent, and (D) 0.05 to 20 parts by weight of a compound having at least one ester group in a molecule, said compound being selected from the group consisting of esters having an aliphatic unsaturated group at an end of the molecular chain and no siloxane structure in the molecule and esters of saturated polyfunctional carboxylic acids.

2. The composition of claim 1, wherein the heat curable organopolysiloxane composition (A) is an addition curing organopolysiloxane composition.

3. The composition of claim 1, wherein the heat curable organopolysiloxane composition (A) is an organic peroxide curing organopolysiloxane composition.

4. The composition of claim 1, wherein the adhesive agent (C) is an organic compound or organosilicon compound containing in a molecule at least one group selected from the class consisting of Si—H, alkenyl, acrylic, methacrylic, epoxy, alkoxysilyl, carboxy anhydride, silylamino, silylamide and isocyanate groups, or a mixture thereof.

5. The composition of claim 1, wherein the adhesive agent (C) is an organosilicon compound containing in a molecule at least one group selected from Si—H and alkenyl groups and at least one group selected from the class consisting of epoxy, alkoxysilyl, acrylic, methacrylic, carboxy anhydride, amino and amide groups, or a mixture thereof.

6. The composition of claim 1, wherein the adhesive agent (C) is an organosilicon compound of 1 to 30 silicon atoms containing in a molecule at least one Si—H group and at least one phenyl or phenylene skeleton.

7. An integrally molded article comprising the silicone rubber adhesive composition of claim 1 in the cured state and a thermoplastic resin.

8. The composition of claim 1, wherein the reinforcing silica fines (B) comprise fumed silica having a specific surface area of 50 to 400 $m^2/g$.

9. The composition of claim 1, wherein the chemical compound having at least one ester group in a molecule (D) has an aliphatic unsaturated group at an end of its molecular chain.

10. The composition of claim 1, wherein the chemical compound having at least one ester group in a molecule (D) is selected from the group consisting of lauryl acrylate, 2-phenoxyethyl acrylate, allyl benzoate, tetraallyl pyromellitate, and γ-acryloxypropyltrimethoxysilane.

11. The composition of claim 1, comprising 100 parts by weight of component (A), 2 to 80 parts by weight of component (B), 0.2 to 30 parts by weight of component (C), and 0.1 to 10 parts by weight of component (D).

12. The composition of claim 1, further comprising 1 to 20 parts by weight of a non-functional organopolysiloxane having phenyl groups.

13. The article of claim 8, wherein the thermoplastic resin is selected from the group consisting of polycarbonates, polybutylene terephthalates, polymethyl methacrylates, polyphenylene sulfides, nylon 66, and polyphthalimides.

14. The composition of claim 1, wherein component (D) is an ester having an aliphatic unsaturated group at an end of the molecular chain and no siloxane structure in the molecule, said ester being selected from the group consisting of alkyl acrylates, alkyl methacrylates, aromatic ring-bearing acrylates, aromatic ring-bearing methacrylates, alkyl vinyl acetates, aromatic ring-bearing vinyl acetates, alkyl allyl esters, aromatic ring-bearing allyl esters, acrylic silanes, and methacrylic silanes.

* * * * *